United States Patent
Newmeyer

[15] 3,699,398
[45] Oct. 17, 1972

[54] SENSOR FOR VEHICULAR TRAFFIC COUNTERS

[72] Inventor: Reed A. Newmeyer, 4521 West Claremont, Glendale, Ariz. 85301

[22] Filed: Oct. 12, 1971

[21] Appl. No.: 188,113

[52] U.S. Cl........317/148.5 R, 317/DIG. 1, 340/240, 340/272
[51] Int. Cl..........................G08b 13/10, G08g 1/02
[58] Field of Search...317/DIG. 1, 148.5 R; 340/240, 340/272

[56] References Cited
UNITED STATES PATENTS

| | | | |
|---|---|---|---|
| 3,031,626 | 4/1962 | Dazey | 340/240 |
| 3,198,250 | 8/1965 | Hoch et al. | 166/250 |
| 3,346,842 | 10/1967 | Dixon | 340/272 |
| 3,582,692 | 6/1971 | Palini | 340/272 |
| 3,631,439 | 12/1971 | Nichols | 340/240 |

*Primary Examiner*—L. T. Hix
*Attorney*—Herbert E. Haynes, Jr.

[57] ABSTRACT

A pneumatic road tube, an electromagnetic transducer and an electronic circuit provide a vehicle sensor mechanism for use in a traffic counting system. A complex air pressure wave is produced within the tube each time a vehicle runs over the tube, the wave is sensed by the transducer which responds by producing an electric signal. The electric signal is coupled to the circuit which blanks out unwanted portions of the signal and shapes the remainder into a signal suitable for application to a counting device.

7 Claims, 2 Drawing Figures

PATENTED OCT 17 1972

3,699,398

INVENTOR.
REED A. NEWMEYER
BY
Herbert E. Haynes Jr.
AGENT

SENSOR FOR VEHICULAR TRAFFIC COUNTERS

BACKGROUND OF THE INVENTION

1. Field of the Invention

This invention relates to sensing devices and more particularly to a vehicle sensor for use in a traffic counting system.

2. Description of the Prior Art

Vehicular traffic counting mechanisms have traditionally included an elongated hollow pneumatic road tube which is stretched across one or more traffic lanes in a roadway. The tube is closed on one end and has its other end connected to an air switch. When a vehicle passes over the tube, an air pressure wave is generated within the tube, this wave is sensed by the air switch which in response thereto momentarily closes an electric switch. A counting device is connected to the terminals of the switch and counts each time the switch closes.

The air switch has proven to be the most inaccurate portion of the system due to its inability to accurately respond to the variety of complex air pressure waves created within the tube.

The air pressure waves created within the tube are complex in that they are multipulse oscillating waves of various amplitudes, pulse widths and frequencies. Several factors affect the characteristics of these wave forms, such as; speed of the traffic, weight of the vehicle, tire width, location along the length of the tube where the vehicle contacts the tube, and wave attenuation within the tube.

High speed traffic produces a wave having high amplitude, short pulse width, and high frequency. Low speed traffic produces a wave having lower amplitude, longer pulse width, and lower frequency. Heavy vehicles create a wave having higher amplitude than the wave created by a light vehicle. Wide tires displace more air within the tube than a narrow tire, thus the wave produced by a wide tire has greater amplitude than that created by a narrow tire.

The attenuation of an air pressure wave increases approximately as the square of the inside diameter of the tube decreases. That is, a tube having an inside diameter of three-sixteenths inches will attenuate a wave more than a tube of ⅜ inch inside diameter. Other conditions affect attenuation of the pressure wave such as tube length, wall thickness and tube condition.

A relatively light vehicle which contacts the road tube in the proximity of the air switch produces a signal which easily operates the switch. When the same vehicle contacts the tube on its other end, the wave may be attenuated along the length of the tube to a point where it is of insufficient amplitude to activate the air switch.

Another problem affecting the accuracy of traffic counting mechanisms is reflected pressure waves, that is, one which bounces off the closed end of the road tube.

It may be apparent from the foregoing brief description of the complexity of the air pressure waves that the air switch must be able to respond to a tremendous variety of wave forms. Several types of switches have been employed in an attempt to solve this problem.

One prior art device employs a ball placed in a vertically disposed funnel-shaped opening. The ball is moved by the pressure wave to close the contacts of an electric switch.

Another prior art device is provided with a small permanent magnet which is moved by the pressure wave. A set of switch contacts are sealed in a glass enclosure and are adapted to open and close in response to movements of the magnet.

The most widely used method employs a diaphragm which is displaced by the pressure wave to mechanically operate a set of electrical contacts. This device is adjustable to increase or decrease its sensitivity according to the conditions in which it is operating. This adjustment is a rather complex procedure requiring the services of a technician who is trained in the field of traffic counting and is thoroughly familiar with the equipment and the conditions which affect its performance.

The latter air switch as well as the other prior art devices all tend to overcount the vehicular traffic due to plurality of individual pulses within a single pressure wave which cause the switch contacts to chatter. Further, reflected waves may also cause overcounting in these prior art devices.

In view of the foregoing, a need exists for a new sensor for use in vehicular traffic counting systems which eliminates some of the problems of the prior art devices.

SUMMARY OF THE INVENTION

In accordance with the invention, a new and useful sensor mechanism for use in vehicular traffic counting system is disclosed.

An electromagnetic transducer is employed to sense a vehicle produced input signal in the form of an air pressure wave created by a vehicle contacting a pneumatic road tube. The transducer responds to the air pressure wave by electromagnetically inducing a voltage, the characteristics of which are determined by the characteristics of the pressure wave.

The induced voltage is coupled to an electronic circuit which blanks out unwanted portions of the signal and any reflections thereof and responds to the remaining portions of the signal by producing a single output signal. This output signal is shaped and timed by the electronic circuit so as to be independent of the characteristics of the induced voltage.

Accordingly, it is one object of the present invention to provide a new and useful vehicle sensor for use in a traffic counting system.

Another object of the present invention is to provide a new and useful vehicle sensor which produces a single output signal when a vehicle produced input signal is applied thereto.

Another object of the present invention is to provide a new and useful vehicle sensor mechanism for sensing a vehicle produced input signal and producing a single output signal the characteristics of which are independent of the vehicle produced input signal.

Still another object of the present invention is to provide a new and useful vehicle sensor for sensing a vehicle produced input signal and producing a single output signal of predetermined amplitude and pulse width in response thereto.

Yet another object of the present invention is to provide a new and useful vehicle sensor mechanism in which the passage of a vehicle produces an input signal in a pneumatic road tube, the input signal is routed through an electromagnetic transducer and an electronic circuit which coact to produce a single output signal suitable for application to a counting device.

The foregoing and other objects of the present invention, the various features thereof, as well as the invention itself, may be more fully understood from the following description when read in conjunction with the accompanying drawings.

DESCRIPTION OF THE PREFERRED EMBODIMENT

Figure 1:
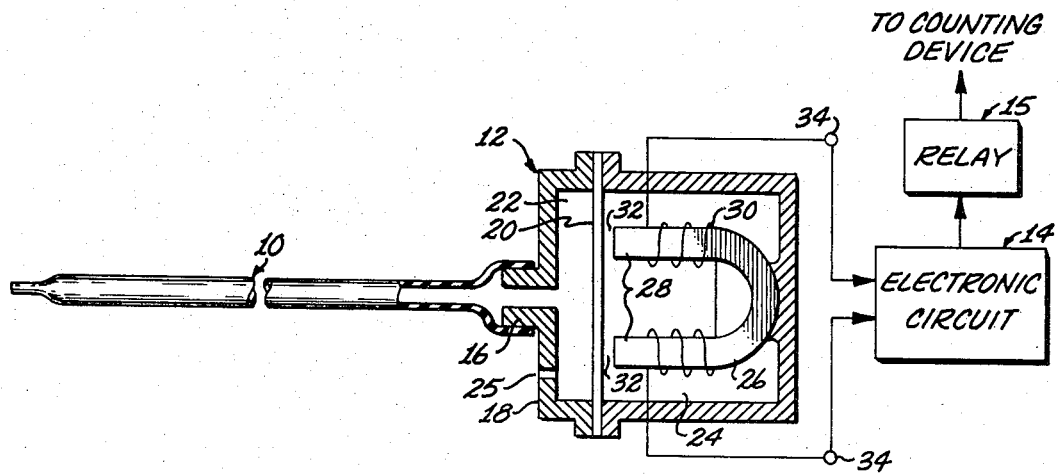
FIG. 1 is an illustration in schematic form of a vehicle sensor mechanism of the present invention including the various elements and showing some of the features thereof.

Referring more particularly to the drawings, FIG. 1 illustrates a road tube 10, an electromagnetic pressure transducer 12, an electronic circuit 14 and a relay 15. The circuit 14 and relay 15 being shown in block form in this figure. These elements in combination comprise the preferred embodiment of the vehicle sensor mechanism of the present invention.

The road tube 10 is an elongated hollow pneumatic tube formed of resilient material. The fabrication and operating characteristics of the tube 10 are well known in the art.

An air pressure wave is transmitted along the length of the tube 10 each time a vehicle runs over the tube. This air pressure wave is complex in nature and may be generally defined as multi-pulse oscillating wave of decreasing amplitude. The amplitude, pulse width and frequency of the pressure wave are determined by several factors such as vehicle weight, tire size, condition and length of the tube 10, and the point along the length of the tube at which the vehicle contacts the tube.

The electromagnetic pressure transducer 12 is coupled to one end of the road tube 10 by a suitable fitting 16 or boss provided on a housing 18. The housing 18 is preferably fabricated of any suitable paramagnetic material. A metallic diaphragm 20 formed of ferromagnetic material is mounted within the housing 18 to divide it into a first chamber 22 and a second chamber 24. The diaphragm 20 is positioned within the housing 18 so that its central portion is disposed adjacent the fitting 16. By positioning the diaphragm 20 as described, it may be easily seen that the pressure wave from the tube 10 will enter the first chamber 22 and impinge upon the diaphragm 20. This action will displace the central portion of the diaphragm 20 a distance proportional to the amplitude of the pressure wave, and at a speed proportional to the speed of the wave.

An ambient pressure equalizing port 25 is provided in one wall of the first chamber 22. The port 25 is of small diameter so as not to decrease the effect of the pressure wave.

A permanent magnet 26 is fixedly mounted within the second chamber 24 of the housing 18 and is positioned so that the poles 28 of the magnet are adjacent to the diaphragm 20. A conductive wire 30 is wound on the poles 28 of the magnet 26.

It should be apparent that the placement of the diaphragm 20 adjacent to the poles 28 of the magnet 26 results in an air gap 32. The size of the air gap 32 will change in accordance with movements of the diaphragm. Changes in the air gap 32 will cause a voltage to be induced in the coils of the conductor 30 in accordance with the well-known principles of electromagnetic induction. It should be noted that the characteristics of the induced voltage, such as amplitude and pulse width are determined by the speed and amount of movement of the diaphragm which is in direct proportion to the characteristics of the pressure wave. The induced voltage is applied to a pair of output terminals 34 of the transducer 12.

Figure 2:
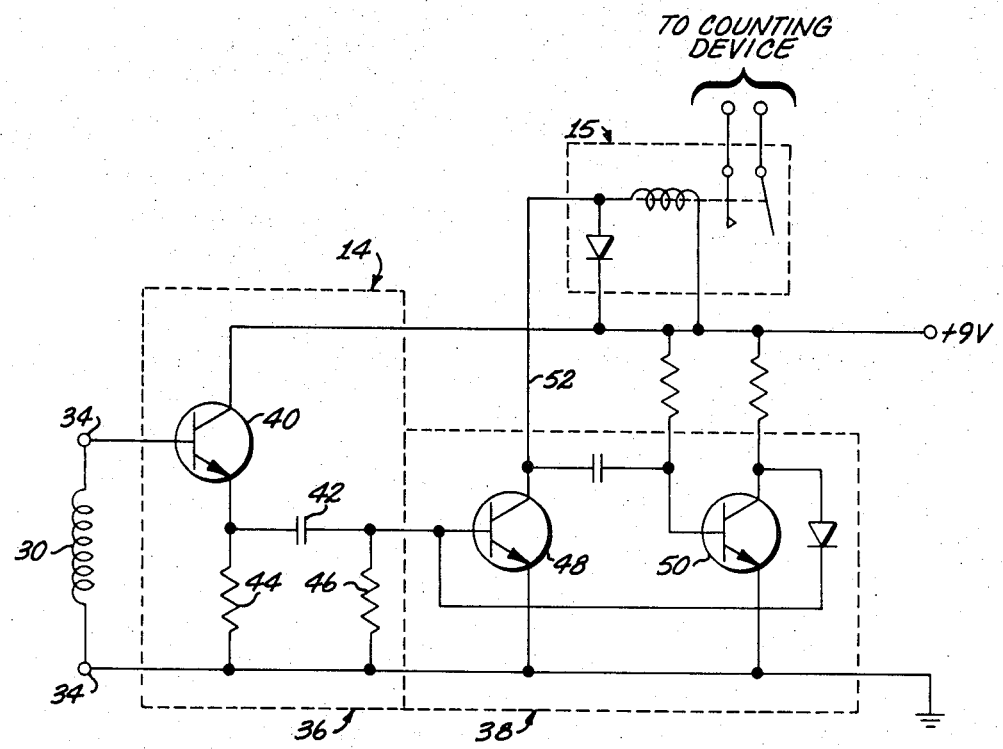
FIG. 2 is a diagrammatic illustration of the electronic circuit of the present invention.

With reference now to FIG. 2 of the drawings wherein the electronic circuit 14 and the relay 15 are shown in detail.

The electronic circuit 14 includes a variable threshold circuit 36 and a signal interrupting means 38.

The signal applied to the terminals 34, as hereinbefore described, is coupled to a transistor 40 which is part of the threshold circuit 36. The transistor 40 multiplies (amplifies) the signal which maintains the transistor 40 in the conductive state as long as the voltage value of this signal is rising. The output signal from the transistor 40 is coupled to a capacitor 42 and charges it to a value determined by the amplitude of the signal applied thereto from the transistor 40.

The capacitor 42 a.c. couples this signal to the interrupting means 38 and is therefore the output signal from the threshold circuit 36.

The transistor 40, the capacitor 42 and a pair of resistors 44 and 46 comprise the threshold circuit 36, the output signal from which has a predetermined decay or discharge time. The decay of the output signal from the threshold circuit 36 is determined by the values of its component parts and the value of the charge applied to the capacitor 42 by the signal from transistor 40.

The decay time of the output signal from the threshold circuit 36 will typically be in the range of 50 to 1000 milliseconds.

It may be seen that the threshold sensitivity increases as the capacitor 42 discharges. Also, the threshold value of the output signal will be low when weak pulses from the transducer 12 are received and high when strong pulses are received and the value of the decaying output signal will be automatically adjusted to a new level when the capacitor 42 is recharged.

A vehicle passing over the road tube 10 will cause a multi-pulse air pressure wave which in turn will cause a multi-pulse electric signal to be induced by the transducer 12 as hereinbefore described. The initial pulse of the pressure wave is larger in amplitude than any subsequent pulses of the same wave. Therefore, the initial pulse of the induced signal is larger in amplitude than any subsequent pulses induced by the same pressure wave. Thus, the initial pulse of the induced signal will charge the capacitor 42 to a higher value than could be achieved by the subsequent pulses. It may now be easily seen that the initial charge on the capacitor 42 will produce a decaying output signal from the threshold circuit 36 which will mask or blank out subsequent signals which would otherwise result from the same pressure wave or reflections thereof.

However, in some instances a single set of vehicle wheels may cause a second pulse which is of higher amplitude than the initial pulse which could result in double counting of the vehicle.

Some examples of conditions which may cause this are whipping of the road tube 10, or a vehicle passing over the tube so that the two wheels of the same axle do not contact the tube simultaneously.

To insure that a single output signal is produced by the electronic circuit 14 for each axle of a vehicle, the output signal from the threshold circuit 36 is coupled to the signal interrupting means 38.

The signal interrupting means 38 may be any device which responds to the output signal from the threshold circuit 36 by relaying the occurrence of the signal to a suitable counter (not shown) and then interrupting the output signal for a predetermined length of time.

For reasons to be hereinafter described, the preferred method of accomplishing the signal interrupt function is by employing a monostable multivibrator (one-shot) as the signal interrupting means 38.

The one-shot 38 comprises a pair of transistors 48 and 50 and other suitable components which cooperate to produce an output signal for a predetermined length of time. The principles and operation of the one-shot 38 are well known in the art and therefore will not be described in detail. The component values employed in the one-shot 38 are selected so as to produce an output signal for a duration of between 20 to 100 milliseconds, this duration having been determined to be suitable for this particular application.

It is well known in the art that once the one-shot 38 has been triggered, no subsequent triggering signals applied thereto will affect its operation during its operating period. Therefore, only one output signal from the one-shot 38 is applied to a conductor 52 due to saturation of transistor 48 during the operating period of the one-shot 38.

Employing the one-shot 38 to accomplish the signal interrupting function as hereinbefore described results in two additional features which are desirable in most applications. These features are related to the output signal produced by the one-shot 38. That is, each output signal will have substantially the same amplitude and substantially the same pulse with regardless of the characteristics of the triggering signal. These features result from the inherent properties of the one-shot 38 and are desirable in that they shape and time the signal as required by some counting devices being currently employed in the field of vehicular traffic counting.

It should be understood that the signal interrupting function could be accomplished by other methods and apparatus.

By way of example, the output signal from the threshold circuit 36 could be coupled directly to the counting device (not shown) through a suitable, normally closed, electric switch (not shown). The same signal is simultaneously coupled through a delay circuit (not shown) to a timing device (not shown) which would open the switch for a predetermined time. This apparatus therefore opens the signal path from the threshold circuit 36, rather than the saturated condition maintained by the one-shot 38 as previously described.

This latter apparatus provides the necessary signal interrupting function but lacks the features of shaping and timing of the output signal that are inherent with the one-shot 38. However, these features of output pulse shaping are not required in all counting applications.

Another feature which may be desirable in some applications, but is not necessary to the function of the sensor mechanism of the present invention, is that of electrically isolating the circuit 14. To accomplish this isolation, the output signal applied to the conductor 52 is employed to energize the relay 15 from its normally open state to a closed state each time a signal is applied thereto. Each time the relay 15 is closed, the counting device (not shown) records the event and this count is indicative of the number of vehicles passing over the tube 10.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications within the limits only of the true spirit and scope of the invention.

What I claim is:

1. A sensor mechanism for use in a vehicular traffic counting system comprising:
   a. a pneumatic road tube having at least one end open, said tube producing a multi-pulse pressure wave within the hollow bore thereof when contacted by the vehicle;
   b. an electromagnetic transducer coupled to the open end of said pneumatic road tube for sensing the pressure wave produced therein and generating an electric signal in response thereto, the characteristics of which are determined by the characteristics of the pressure wave sensed; and
   c. an electronic circuit coupled to receive the electric signal from said electromagnetic transducer and produce a single output signal for each pressure wave sensed by said transducer.

2. A sensor as defined in claim 1 wherein said electro-magnetic transducer comprises:
   a. a magnet;
   b. a coil of conductive wire wound on the poles of said magnet; and
   c. a metallic diaphragm disposed to sense the pressure wave from said road tube and move in response thereto, said diaphragm mounted adjacent to the poles of said magnet to provide an air gap therebetween so that movements of said diaphragm will electromagnetically induce a voltage in said coil of conductive wire.

3. A sensor as claimed in claim 1 wherein said electromagnetic transducer comprises:
   a. a housing;
   b. a metallic diaphragm mounted within said housing and positioned therein to provide a first and a second chamber within said housing;
   c. fitting means on said housing for coupling said road tube to said housing, said fitting means communicating with the first chamber provided in said housing to allow the pressure wave to impingingly move said diaphragm;

d. a magnet fixedly mounted in the second chamber of said housing and positioned so that the poles of said magnet are adjacent to said diaphragm; and e. a coil of conductive wire wound on the poles of said magnet in which a voltage is electromagnetically induced in response to movements of said diaphragm.

4. A sensor as claimed in claim 1 wherein said electronic circuit comprises:

a. a threshold circuit coupled to receive the electric signal from said transducer and produce an output signal in response thereto; and b. signal interrupting means coupled to receive the output signal from said threshold circuit for relaying the occurrence of this signal and then blanking out subsequent signals from said threshold circuit for a predetermined time.

5. A sensor as claimed in claim 1 wherein said electronic circuit comprises:

a. a variable threshold circuit coupled to receive the electric signal from said transducer and respond thereto by producing a threshold output signal the value of which is determined by the highest pulse amplitude of the electric signal received, the threshold output signal having a predetermined decay time for masking lower pulse amplitudes of the electric signal received; and b. signal interrupting means coupled to receive the threshold output signal from said threshold circuit for relaying the occurrence of this signal and then masking subsequent threshold output signals for a predetermined time.

6. A sensor as claimed in claim 5 wherein said signal interrupting means comprises a monostable multivibrator.

7. A sensor as claimed in claim 1 wherein the output signal from said electronic circuit is employed to energize a relay for electrically isolating said electronic circuit.

* * * * *